(12) United States Patent
Kitahara

(10) Patent No.: US 7,891,827 B2
(45) Date of Patent: Feb. 22, 2011

(54) PROJECTOR

(75) Inventor: Wataru Kitahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1020 days.

(21) Appl. No.: 11/715,357

(22) Filed: Mar. 8, 2007

(65) Prior Publication Data

US 2007/0211229 A1 Sep. 13, 2007

(30) Foreign Application Priority Data

Mar. 9, 2006 (JP) .............................. 2006-064688
Mar. 9, 2006 (JP) .............................. 2006-064715

(51) Int. Cl.
*G03B 21/14* (2006.01)
*G03B 21/22* (2006.01)
*B42F 13/00* (2006.01)

(52) U.S. Cl. ....................................... 353/119; 248/343
(58) Field of Classification Search ................. 353/119, 353/122; 248/674, 675, 343, 317, 323, 918, 248/917, 919, 920, 342; 352/242, 243; 411/338, 411/339

See application file for complete search history.

(56) References Cited

U.S. PATENT DOCUMENTS 6,779,593 B1 * 8/2004 Hegde ........................ 165/80.3
7,481,410 B2 * 1/2009 Umberg ........................ 248/551
2005/0185386 A1 8/2005 Okoshi et al.

FOREIGN PATENT DOCUMENTS

| JP | A-63-210779 | 9/1988 |
| JP | U-5-43572 | 6/1993 |
| JP | A-7-273478 | 10/1995 |
| JP | A-2000-29139 | 1/2000 |
| JP | A 2005-215144 | 8/2005 |
| JP | A 2005-234307 | 9/2005 |
| JP | A-2005-332932 | 12/2005 |
| JP | A-2006-348979 | 12/2006 |

* cited by examiner

*Primary Examiner*—Georgia Y Epps
*Assistant Examiner*—Ryan Howard
(74) *Attorney, Agent, or Firm*—Oliff & Berridge PLC

(57) ABSTRACT

A projector, includes: a light source, an optical modulator that modulates a light beam emitted from the light source to form an optical image, a projection optical device that projects the formed optical image, an exterior casing that accommodates the light source, the optical modulator and the projection optical device, the exterior casing provided with a hole in which a fixing member fixing the projector at a predetermined position is inserted, the hole penetrating the exterior casing, an attaching member engaged with the fixed member that is inserted through the hole at a position corresponding to the hole in the exterior casing, the attaching member having a flange portion facing an inner surface of the exterior casing, the flange portion having an outer diameter larger than an inner diameter of the hole, and an interposed member disposed between the inner surface of the exterior casing and the flange portion, the interposed member having an outer diameter larger than an outer diameter of the flange portion.

8 Claims, 7 Drawing Sheets

PROJECTOR

The entire disclosure of Japanese Patent Application No. 2006-064688 and 2006-064715, both filed Mar. 9, 2006, is expressly incorporated by reference herein.

BACKGROUND

1. Technical Field

The present invention relates to a projector attachable on a ceiling or a wall surface such as a lateral wall of a building, the projector including: a light source; an optical modulator that modulates a light beam emitted from the light source to form an optical image; a projection optical device that projects the formed optical image; and an exterior casing that accommodates the light source, the optical modulator and the projection optical device.

2. Related Art

There have been known projectors which modulate a light beam emitted from a light source in accordance with image information to form an optical image, the projectors projecting the optical image on a screen and the like in an enlarged manner. Such a projector is often used in a normal posture in which the projector is placed on an installation surface of a desk and the like such that the upside of the projector is up. However, the projector may also be used in a suspended posture in which the projector is attached on a ceiling and the like such that the upside in the normal posture is down. Accordingly, there has been also known a projector that has a structure enabling the projector to be attached on a ceiling and the like (see, for example, JP-A-2005-215144 (Page 15, FIG. 13)).

The projector disclosed in the document can be fixed on a ceiling by a fixing portion provided to a lower case of the projector such as an insert nut and a fixing member fixed on the ceiling such as a bolt.

However, in the projector disclosed in the document, when the fixing portion (such as the insert nut) covered with oil and the like is attached on the lower case, the oil may permeate the lower case, which may cause a chemical stress crack in the lower case. When the chemical stress crack occurs, the lower case may be damaged and the projector may fall off from the ceiling leaving the fixing portion on the ceiling. Hence, it is required to separately provide an anti-fall structure to the projector. As a result, the structure of the projector may be complicated and the manufacturing cost of the projector may be increased.

Due to such problems, there have been demanded projectors which have a simple structure but can prevent a fall of the projector even when the projectors are attached in the suspended posture.

SUMMARY

An advantage of some aspects of the invention is a projector that can prevent the projector from falling off with a simple arrangement.

According to an exemplary aspect of the invention, a projector includes: a light source, an optical modulator that modulates a light beam emitted from the light source to form an optical image, a projection optical device that projects the formed optical image, an exterior casing that accommodates the light source, the optical modulator and the projection optical device. The exterior casing is provided with a hole in which a fixing member fixing the projector at a predetermined position is inserted. The hole penetrates the exterior casing. The attaching member engaged with the fixed member that is inserted through the hole at a position corresponding to the hole in the exterior casing. The attaching member has a flange portion facing an inner surface of the exterior casing. The flange portion has an outer diameter larger than an inner diameter of the hole. An interposed member is disposed between the inner surface of the exterior casing and the flange portion. The interposed member has an outer diameter larger than an outer diameter of the flange portion.

The predetermined position may include a ceiling or a wall surface of a lateral wall of a building.

According to the exemplary aspect of the invention, the fixing member is engaged with the attaching member via the hole formed in the exterior casing. Between the inner surface of the exterior casing in which the hole is formed and the flange portion of the attaching member provided in the hole, the interposed member is disposed which has the outer diameter larger than the outer diameter of the flange portion.

Accordingly, when the fixing member and the attaching member are engaged with each other, the flange portion provided on the attaching portion supports the exterior casing with the interposed member, so that the projector can be attached on the wall surface.

In the projector attached on the wall surface, when the exterior casing is damaged at a position in the hole or in the vicinity of the hole and the projector becomes almost off from the wall surface, the flange portion of the attaching member engaged with the fixing member supports the inner surface of the exterior casing against the load of the projector, the flange portion supporting the inner surface via the interposed member disposed between the inner surface of the exterior casing and the flange portion of the attaching member. Accordingly, the projector can be prevented from falling from the wall surface. Hence, the projector can be prevented from falling off with a simple arrangement. In addition, workability in press-inserting the attaching member into the hole can be enhanced.

According to the exemplary aspect of the invention, the attaching member is an insert nut that is inserted in the hole. The insert nut has a cylindrical portion in which a screw hole is formed. The interposed member is a washer that has a hole in which the cylindrical portion is inserted. The fixing member is a bolt screwed into the screw hole.

According to the exemplary aspect of the invention, the attaching member, the interposed member and the fixing member are respectively formed by the insert nut, the washer and the bolt, so that the arrangement can be simple. Accordingly, the arrangement of the projector can be further simplified.

Since the attaching member is the insert nut, the attaching member can be easily attached by heat-pressing the attaching member in the exterior casing, ultrasonic processing and the like.

Since the bolt as the fixing member is screwed in the insert nut as the attaching member, the projector can be easily and the reliably attached on the wall surface.

According to the exemplary aspect of the invention, a rising portion is provided on the inner surface of the exterior casing. The rising portion rises from the inner surface. The rising portion corresponds to the outer diameter of the interposed member. The rising portion encloses the hole.

According to the exemplary aspect of the invention, since the rising portion enclosing the hole is provided on the inner surface of the exterior casing, the inner surface facing the interposed member, the thickness of the exterior casing becomes large, thereby enhancing the strength of the exterior casing. Accordingly, when the projector is set on the wall surface, the strength of the exterior casing against the stress that is applied by the flange portion of the attaching member via the interposed member can be enhanced with a simple arrangement and load per unit area can be reduced. Therefore, the projector can be more reliably prevented from falling off.

When the exterior casing is formed of synthetic resin and the rising portion is formed by a plurality of ribs, the plurality of ribs can prevent or suppress a deformation of the exterior casing in an area in which the plurality of ribs is formed.

Note that when the exterior casing is formed of synthetic resin and if the thickness of the exterior casing partially varies, a deformation such as a dent (a sink mark) may occur in an opposite surface of a portion in which the thickness is large in molding the exterior casing.

In contrast, since the plurality of ribs is formed on the inner surface of the exterior casing, the inner surface facing the interposed member, the area of the exterior casing in which the thickness dimension varies can be small or divided. Hence, the deformation of the exterior casing can be prevented or suppressed.

According to an exemplary aspect of the invention, a projector includes: a light source, an optical modulator that modulates a light beam emitted from the light source to form an optical image, a projection optical device that projects the formed optical image, an exterior casing that accommodates the light source, the optical modulator and the projection optical device. The exterior casing is provided with a boss having a hole in which a fixing member that fixes the projector at a predetermined position is inserted. The hole is provided with an attaching member. The attaching member is disposed inside the hole. The attaching member engages with the exterior casing. The fixing member inserted in the hole. The boss has a first lateral portion forming the hole, a second lateral portion formed apart from the first lateral portion by a predetermined distance. The second lateral portion encloses a periphery of the first lateral portion. A bridge portion connects the first lateral portion and the second lateral portion.

According to the exemplary aspect of the invention, the bridge portion connects the first lateral portion and the second lateral portion which form the boss of the exterior casing. Accordingly, even when the first lateral portion forming the hole in which the attaching portion is disposed is damaged, the attaching portion engaged with the fixing member to attach the projector at a predetermined position on a ceiling or a lateral wall, the first lateral portion can be prevented or suppressed from bulging to form a deformation. Hence, when the projector is attached on a ceiling, a wall and the like, the projector can be prevented from falling off.

Specifically, when the above-described chemical stress crack and the like occur and the first lateral portion forming the hole is damaged, the first lateral portion may bulge outward. In this case, the exterior casing may be disengaged from the attaching member provided in the hole, the attaching member being still in engagement with the fixing member, so that the projector may fall off.

In contrast, according to the exemplary aspect of the invention, since the bridge portion connects the first lateral portion forming the boss and the hole with the second lateral portion around the first lateral portion, the second lateral portion forming the boss, even when the first lateral portion is damaged, the first lateral portion can be prevented or suppressed from bulging. Accordingly, it is possible to prevent a disengagement of the exterior casing form the attaching member engaged with the fixing member. Hence, even when being held in the suspended posture for a long time, the projector can be prevented from falling.

Further, the bridge portion connects the first lateral portion and the second lateral portion which form the boss, forming a space between the first lateral portion and the second lateral portion. Accordingly, even when a crack occurs in the first lateral portion, the second lateral portion can prevent or suppress growth of the crack. Hence, it is possible to prevent the crack from entering the second lateral portion and to prevent the boss from falling off from the exterior casing, thereby preventing the projector from falling off.

According to the exemplary aspect of the invention, the boss is formed in a substantially circular conical shape or a polyhedral pyramid shape. The second lateral portion is formed so as to be closer to the first lateral portion as the second lateral portion projects in an out-of-plane direction of the exterior casing.

According to the exemplary aspect of the invention, the second lateral portion is inclined to the first lateral portion such that an end in a projecting direction of the second lateral portion becomes closer to the first lateral portion, forming the boss in a substantially circular or polyhedral pyramid shape as a whole, so that a portion in which a distance between the first lateral portion and the second lateral portion is small can be formed in the bridge portion connecting the first lateral portion and the second lateral portion. Accordingly, since the resistance against the bulge of the first lateral portion can be large, the first lateral portion can be more strongly prevented or suppressed from bulging outward. Hence, the attaching member can be further reliably prevented or suppressed from falling off and the projector can be reliably prevented from falling off.

Note that when the boss is formed in a substantially circular conic shape, the boss can be formed more easily than a case in which the boss is formed in a polyhedral pyramid shape Therefore, the exterior casing can be easily formed.

According to the exemplary aspect of the invention, the boss is formed so as to project in an out-of-plane direction from an outer surface of the exterior casing.

Accordingly, since the boss is formed so as to project from the outer surface of the exterior casing in the out-of-plane direction, the bridge portion connecting the first lateral portion and the second lateral portion forming the boss is exposed on the inner surface of the exterior casing formed in a substantially box-like shape.

Note that a projection for positioning a component and the like are often formed on the inner surface side of the exterior casing, so that it is required to reduce the number of projections on the outer surface of the exterior casing as far as possible in order to realize a good die releasing. When the bridge portion is exposed on the outer surface, a step is required, in which the molding die is slit at the bridge portion such that the molded exterior casing can be taken out, complicating the forming process of the exterior casing.

In contrast, since the boss is formed so as to project from the outer surface of the exterior casing in the out-of-plane direction, the first lateral portion is covered with the second lateral portion when seen from the outer surface side of the exterior casing, so that the projections on the outer surface of the exterior casing can be reduced. Thereby, the exterior casing can be easily taken out from the molding die in molding the exterior casing. Therefore, the exterior casing can be easily formed.

According to the exemplary aspect of the invention, the attaching portion includes: a cylindrical portion that is inserted in the hole, and a flange portion provided on an end of the cylindrical portion so as to project in a direction substantially orthogonal to an axial direction of the cylindrical portion. The flange portion has an outer diameter larger than an inner diameter of the hole. The flange portion faces an inner surface of the exterior casing. The projector further includes: a washer provided between the inner surface of the exterior casing and the flange portion. The washer has an opening in which the cylindrical portion is inserted. The washer has an outer diameter larger than an outer diameter of the flange portion.

According to the exemplary aspect of the invention, since the flange portion is provided so as to face the inner surface of the exterior casing, the flange portion can be securely engaged with the exterior casing when the attaching member is engaged with the fixing member. Accordingly, the attaching portion can reliably support the load of the projector.

Between the flange portion of the attaching portion and the inner surface of the exterior casing, the washer is disposed, which has the outer diameter larger than the outer diameter of the flange portion. Accordingly, an area in which the attaching portion supports the projector can be increased. Hence, when the attaching member and the fixing member are engaged with each other and the first lateral portion is damaged and the attaching portion almost falls off from the exterior casing, the flange portion and the washer disposed between the flange portion and the inner surface of the exterior casing can support the inner surface of the exterior casing. Thus, the load of the projector can be reliably and stably supported. In addition, the workability in press-inserting the attaching member into the hole can be enhanced.

According to exemplary the aspect of the invention, the outer diameter of the washer is at least enough to reach the bridge portion.

According to the exemplary aspect of the invention, since the washer has the outer diameter enough to reach the bridge portion formed on the outer side of the first lateral portion, even when the connecting portion of the first lateral portion and the bridge portion is damaged and the first lateral portion almost falls off from the exterior casing, the washer that covers the bridge portion can prevent the first lateral portion from falling off. Further, since a contacting area with the exterior casing can be increased, the projector can be stably supported by the washer and the attaching member and the load of the projector can be dispersed on the bridge portion such that load per unit area can be reduced. Therefore, in the state in which the fixing member and the attaching member are in engagement with each other, the exterior casing can be prevented from falling off and thereby the projector can be more reliably prevented from falling off.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the attached drawings.

Outer Appearance of Projector 1

Figure 1:
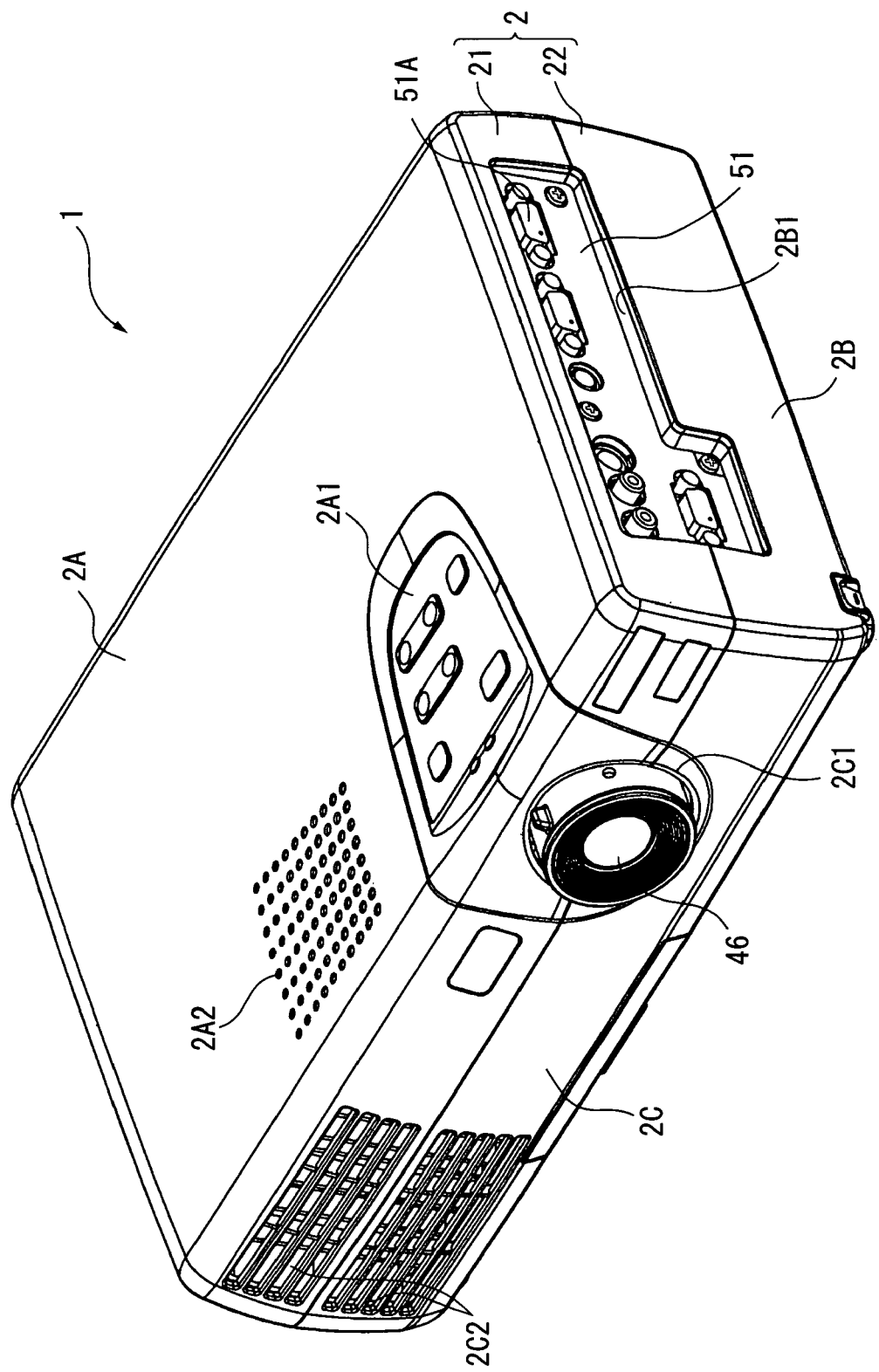
FIG. 1 is a perspective view of a projector according to first and second exemplary embodiments of the invention when seen from an upper front side of the projector.
Figure 2:
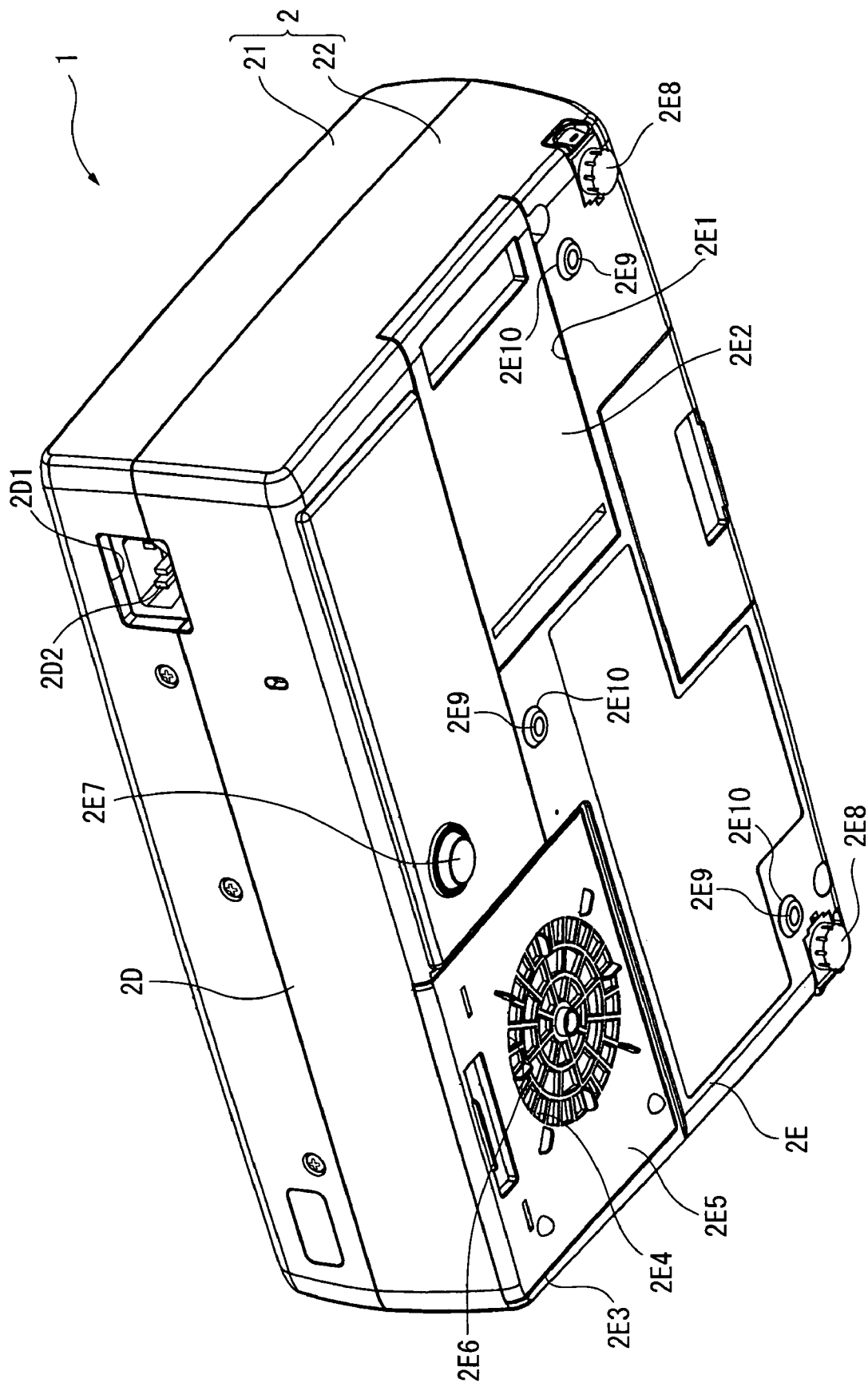
FIG. 2 is a perspective view of the projector according to the aforesaid exemplary embodiments when seen from a lower rear side of the projector.

FIG. 1 is a perspective view of a projector 1 according to a first exemplary embodiment when seen from an upper front side of the projector 1. FIG. 2 is a perspective view of the projector 1 when seen from a lower rear side of the projector.

The projector 1 modulates a light beam emitted from a light source provided in the projector in accordance with image information to form an optical image, the projector projecting the optical image on a screen and the like in an enlarged manner.

As shown in FIGS. 1 and 2, the projector 1 includes an exterior casing 2 that is made of synthetic resin and accommodates a later-described device body 3.

The exterior casing 2 is a substantially rectangular parallelepiped casing molded by injection molding and the like. The exterior casing 2 includes an upper case 21 forming an upper surface, two lateral surfaces, a front surface and a rear surface of the projector 1 and a lower case 22 forming a lower surface, the two lateral surfaces, the front surface and the rear surface of the projector 1. The upper case 21 and the lower case 22 are fixed to each other by a screw and the like. The material of the exterior casing 2 is not limited to the synthetic resin and the like. The exterior casing 2 may be made of another material such as metal.

As shown in FIG. 1, on an upper surface 2A of the exterior casing 2 formed by the upper case 21, an operation panel 2A1 is provided on a front side (on an end side in a projecting direction of an optical image from a later-described projection lens 46). Disposed on the operation panel 2A1 are a power switch and other switches that are used, for example, to zoom the projected image. In the vicinity of the operation panel 2A1, a speaker hole 2A2 for outputting audio is provided. Inside the speaker hole 2A2, a speaker (not shown) is disposed.

Out of the lateral surfaces of the exterior casing 2 formed by the upper case 21 and the lower case 22, a lateral surface 2B that is near the projection lens 46 is provided with an opening 2B1. The opening 2B1 extends across the upper case 21 and the lower case 22. On an inner side of the opening 2B1, an interface substrate 51 is provided, the interface substrate 51 being connected with a later-described control unit. Through the opening 2B1, terminals 51A provided on the interface substrate 51 are exposed. The terminals 51A are connected with an outer electronic apparatus.

In a front surface 2C formed by the upper case 21 and the lower case 22, an opening 2C1 having a substantially circular shape is formed so as to extend across the upper case 21 and the lower case 22 (on the right side in FIG. 1). Through the opening 21C1, the projection lens 46 forming a later-described optical unit 4 is exposed, the projection lens 46 projecting an optical image.

In the front surface 2C, an exhaust port 2C2 is formed on the left side in FIG. 1. Through the exhaust port 2C2, a fan (not shown) provided inside the exterior casing 2 in accordance with the exhaust port 2C2 exhausts air which has cooled electronic components and optical components of the projector 1.

As shown in FIG. 2, in a rear surface 2D formed by the upper case 21 and the lower case 22, an opening 2D1 having a rectangular shape is formed on the right side in FIG. 2. Through the opening 2D1, an inlet connector 2D2 to which a power cable (not shown) is connected is exposed.

In a lower surface 2E formed by the lower case 22, an opening 2E1 that has a substantially rectangular shape and is used for exchanging the later-described optical unit 4 of a light source device 411 (see FIG. 3) is formed on the right side in FIG. 2. On the opening 2E1, a cover 2E2 covering the opening 2E1 is detachably provided. By removing the lamp cover 2E2, the light source device 411 can be easily exchanged.

On the lower surface 2E, a rectangular surface 2E3 is provided on the left side in FIG. 2 so as to be dented inward like a step. In the rectangular surface 2E3, an air inlet opening 2E4 is formed, the air inlet opening 2E4 being for inletting air from the outside. On the rectangular surface 2E3, an air-inlet-opening cover 2E5 covering the rectangular surface 2E3 is detachably provided. In the air-inlet-opening cover 2E5, an opening 2E6 corresponding to the air inlet opening 2E4 is provided. In the opening 2E6, an air filter (not shown) is provided to prevent dust from entering the exterior casing 2.

Further, on the lower surface 2E, a fixing leg 2E7 is formed substantially at a center position on the rear side, the fixing leg 2E7 forming a leg of the projector 1. On right and left corners on the front side, adjusting legs 2E8 are respectively provided.

The two adjusting legs 2E8 are adapted to move in an up and down direction to adjust an inclination of the projector 1 in a front and rear direction and a right and left direction (i.e. to adjust a posture of the projector 1) and thereby to adjust a position of the projected image.

On the lower surface 2E, three bosses 2E10 in total are formed substantially at the center of the lower surface 2E and in the vicinities of the adjusting legs 2E8. In the lower surface 2E, three holes 2E9 are respectively formed by the bosses 2E10.

Inner Structure of Projector 1

Figure 3:
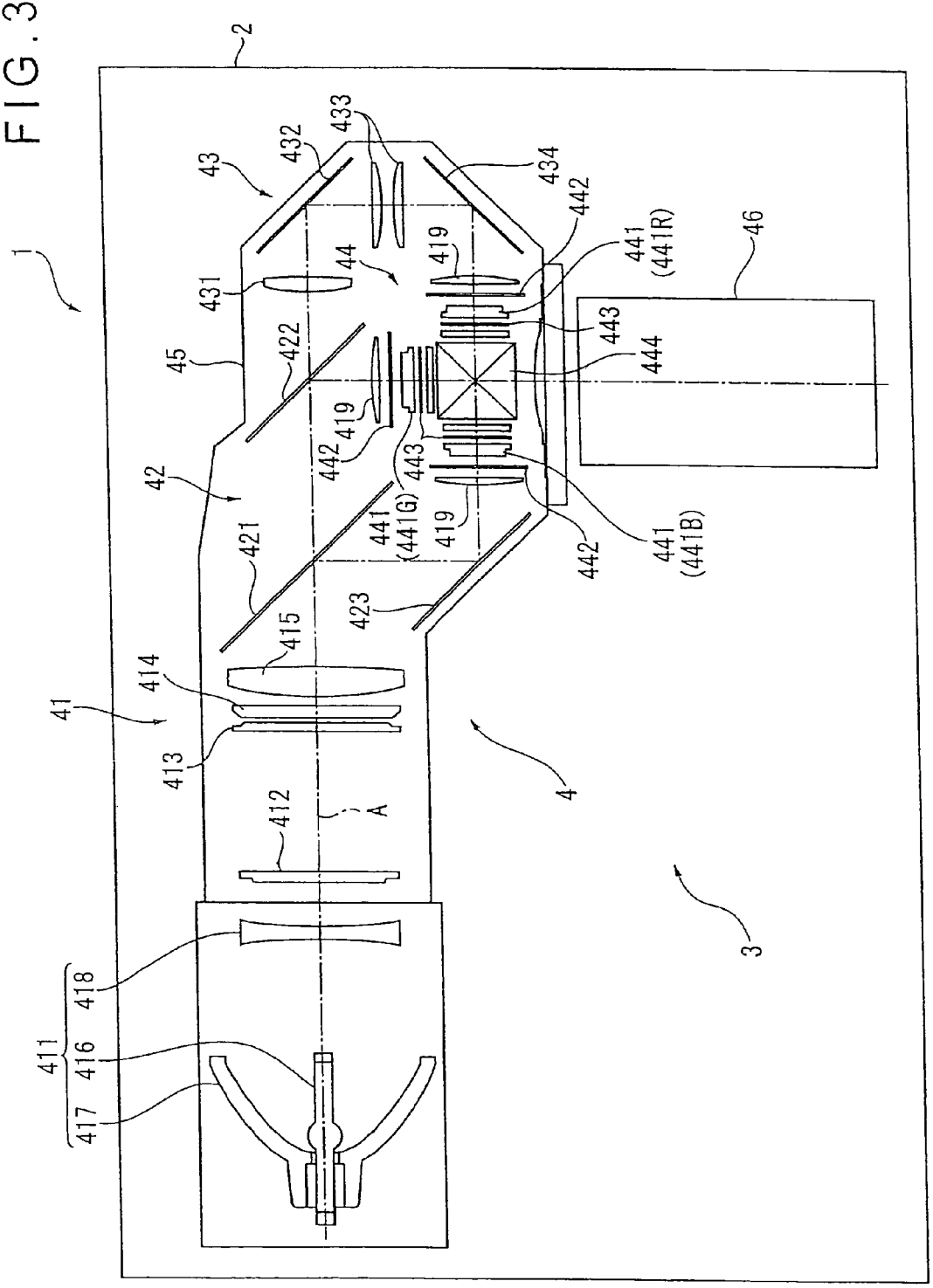
FIG. 3 is a schematic illustration of an inner structure of the projector according to the aforesaid exemplary embodiments.

FIG. 3 is a schematic illustration showing an inner structure of the projector 1.

As shown in FIG. 3, the device body 3 including the optical unit 4 is provided inside the exterior casing 2. In addition to the optical unit 4, the device body 3 includes a power unit, the control unit, a cooling unit and the like (all not shown).

The power unit converts commercial alternating-current which is input via the inlet connector 2D2 (see FIG. 2) to direct current, the power unit supplying the power to electronic components of the projector 1. The control unit processes image information and the like which are input via the terminals 51A (see FIG. 1), the control unit being a circuit substrate that controls the whole projector 1. The cooling unit includes a plurality of fans and drives the plurality of fans under the control of the control unit in order to cool optical components and electronic components which generate heat.

Arrangement of Optical Unit 4

Under the control of the control unit, the optical unit 4 is a unit that optically processes a light beam emitted from the light source and forms an optical image (a color image) in accordance with image information. The optical unit 4 has a substantially L-shape in plan view in which the optical unit 4 extends along the rear surface 2D of the exterior casing 2 (see FIG. 2) and the lateral surface 2B of the exterior casing 2 (see FIG. 1).

As shown in FIG. 3, the optical unit 4 includes an illumination optical device 41, a color separating optical device 42, a relay optical device 43, an electrooptic device 44, an optical component casing 45 that accommodates the optical components 41 to 44 therein and a projection lens 46.

The illumination optical device 41 is an optical system for substantially uniformly illuminating image formation areas of later-described liquid crystal panels 441 of the electrooptic device 44. The illumination optical device 41 includes the light source device 411, a first lens array 412, a second lens array 413, a polarization converter 414 and a superposing lens 415.

The light source device 411 includes a light source lamp 416 emitting a radial light beam, a reflector 417 reflecting the radial light beam emitted by the light source lamp 416 to converge the radial light beam to a predetermined position, and a collimating concave lens 418 collimating the light beam converged by the reflector 417 relative to an illumination optical axis A. As the light source lamp 416, a halogen lamp, a halide lamp and a high-pressure mercury lamp can be used. The reflector 417 may be an ellipsoidal reflector having an ellipsoidal surface or a parabolic reflector having a parabolic surface. When the parabolic reflector is employed as the reflector 417, the collimating concave lens 418 can be omitted.

The first lens array 412 includes small lenses arranged in a matrix form, the lenses each having a substantially rectangular contour when viewed in an optical axis direction in which a light beam is incident on the first lens array 412. The small lenses divide the light beam emitted by the light source device 411 into a plurality of partial light beams.

The second lens array 413 has a similar structure as the first lens array 412, in which small lenses are arranged in a matrix form. Together with the superposing lens 415 provided on the downstream of the second lens array 413 on an optical path, the second lens array 413 focuses an image emitted from the small lenses of the first lens array 412 onto the image formation areas of the below-described liquid crystal panels 441 of the electronic optical device 44.

The polarization converter 414 is disposed between the second lens array 413 and the superposing lens 415 and converts light from the second lens array 413 into substantially uniform-type polarized light.

Specifically, the partial light beams converted into the substantially uniform-type linear polarized light by the polarization converter array 414 are substantially superposed on the image formation areas of the later-described liquid crystal panels 441 by the superposing lens 415. Note that in a projector employing liquid crystal panels for modulating polarized light, only uniform-type polarized light can be utilized, so that approximately a half of the light from the light source device 411 emitting random polarized light is not used. Accordingly, by using the polarization converter 414, the emitting light from the light source device 411 is converted into substantially uniform-type polarized light, thereby enhancing light utilization efficiency of the electronic optical device 44.

The color separating optical system 42 has two dichroic mirrors 421 and 422 and a reflection mirror 423 and separates with the dichroic mirrors 421 and 422 the plurality of partial light beams emitted from the integrator illuminating optical system 41 into red light (R), green light (G) and blue light (B).

The relay optical device 43 includes an incident-side lens 431, a relay lens 433 and reflection mirrors 432, 434 and guides the red light separated by the color separating optical device 42 to a red-light liquid crystal panel 441 (441R).

The dichroic mirror 421 of the color-separating optical device 42 transmits a red light component and a green light component of the light beam emitted from the illumination optical device 41, the dichroic mirror 421 reflecting a blue light component. The blue light that has been reflected by the dichroic mirror 421 is then reflected by the reflection mirror 423 to be transmitted through a field lens 419 to a blue-light liquid crystal panel 441 (441B). The field lens 419 converts the partial light beams emitted from the second lens array 413 into light beams parallel to a central axis (a main light beam) thereof. The field lenses 419 provided on the light-incident sides of a green-light liquid crystal panel 441 and the red-light liquid crystal panel 441 (441G, 441R) function in the same manner.

The green light out of the red and green light having passed through the dichroic mirror 421 is reflected by the dichroic mirror 422 to be transmitted through the field lens 419 to the green-light liquid crystal panel 441 (441G). The red light is transmitted through the dichroic mirror 422, the relay optical device 43 and the field lens 419 to reach the red-right liquid crystal panel 441 (441R). Note that the relay optical device 43 is disposed on the optical path of the red light in order to avoid deterioration in the light utilization efficiency due to light diffusion and the like caused by that the optical path of the red light is longer than those of the other colors. In other words, the relay optical device 43 is so disposed that the partial light beams incident on the incident-side lens 431 can be passed to the field lens 419 as the partial light beams are. Note that, although the red light out of the three colors is adapted to pass through the relay optical device 43, the blue light, for instance, may be alternatively adapted to pass through the relay optical device 43.

The optical device 44 modulates the three types of color light emitted from the color separating optical device 42 in accordance with image information, combines the modulated color light to form an optical image (a color image).

The electrooptic device 44 includes the three liquid crystal panels 441 (the red-light liquid crystal panel 441R, the green-light liquid crystal panel 441G and the blue-light liquid crystal panel 441B) as the optical modulators, three incident side polarization plates 442 respectively disposed on the light beam incident sides of the liquid crystal panels 441, three light emitting side polarization plates 443 respectively disposed on the light beam emitting sides of the liquid crystal panels 441, and a cross dichroic prism 444 as a color-combining optical device.

On the incident side polarization plates 442, the color light of which polarization direction is aligned in a substantially uniform direction by the polarization converter 414 is incident. Out of the incident light beams, the incident side polarization plates 442 only transmit the polarized light substantially in the direction same as the polarization direction of the light beams aligned by the polarization converter 414 and absorb the other incident light beams. The incident side polarization plate 442 has a light-transmissive substrate made of sapphire glass, crystal or the like with a polarization film attached on the substrate.

The liquid crystal panels 441 each include liquid crystal as an electrooptic material sealed in a pair of transparent glass substrates. The orientation of the liquid crystal in the image formation area is controlled in accordance with a drive signal input from the control unit, so that the polarization direction of the polarized light beam emitted from the incident side polarization plate 442 is modulated to form a color image in accordance with the incident color light.

Out of the incident light beams emitted from the liquid crystal panels 441, the light emitting side polarization plates 443 only transmit a light beam having a polarization direction orthogonal to the direction in which the light beam passes the incident side polarization plate 442 and absorbs the other light beams. The light emitting side polarization plate 443 has a similar structure as that of the incident side polarization plate 442.

The cross dichroic prism 444 is an optical element that combines the three types of color light (an R image, a G image and a B image) emitted from the respective light emitting side polarization plates 443 in order to form an optical image (a color image). The cross dichroic prism 444 is square in plan view, which is formed by attaching four right-angle prisms. Two dielectric multi-layer films are formed on the boundaries where the right-angle prisms are attached to each other. The dielectric multi-layer films transmit the color light that has passed through the light emitting side polarization plate 443 disposed on a side opposing to the projection lens 46 (on the green light side) and reflect the color light that has passed through the other two light emitting side polarization plates 443 (on the red and blue light sides). Thus, the three types of color light are modulated by the incident side polarization plates 442, the liquid crystal panels 441 and the light emitting side polarization plates 443 and combined into a color image.

The optical component casing 45 is a box-like shape member made of synthetic resin. A predetermined illumination optical axis A is set in the optical component casing 45 and the above-described optical components 41 to 44 are disposed at predetermined positions relative to the illumination optical axis A. Although not shown, the optical component casing 45 is positioned and fixed at a predetermined position by a positioning projection or the like which is formed in the lower case 22. In the optical component casing 45, a plurality of grooves is also formed to position and fix the optical components 41 to 44.

The projection lens 46 projects the optical image (the color image) formed by the optical unit 44 on a screen (not shown) in an enlarged manner. The projection lens 46 is a lens set which accommodates a plurality of lenses in a cylindrical barrel.

Arrangement of Attaching Structure 7

Figure 4:
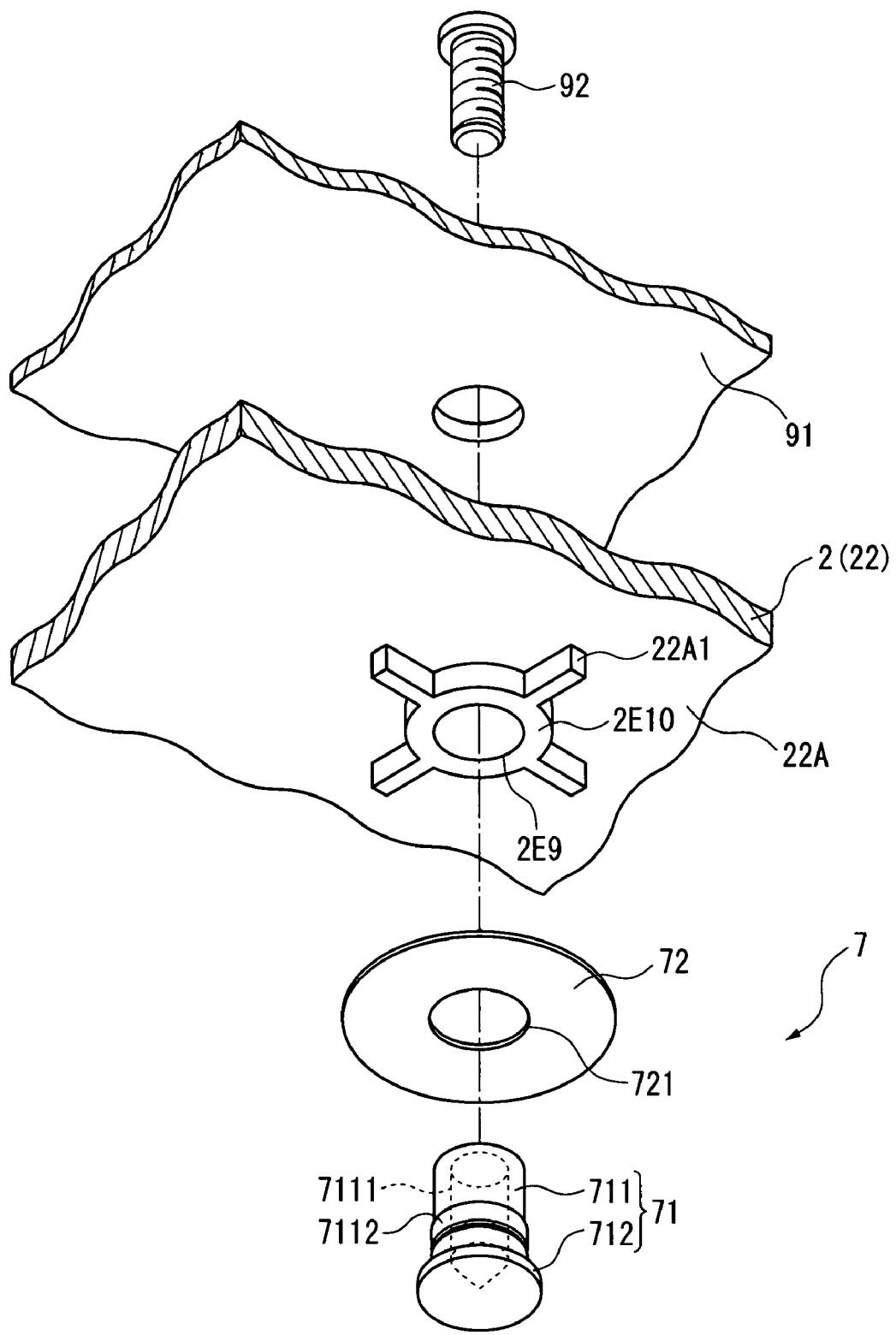
FIG. 4 is an exploded perspective view of an attaching structure according to the first exemplary embodiment.
Figure 5:
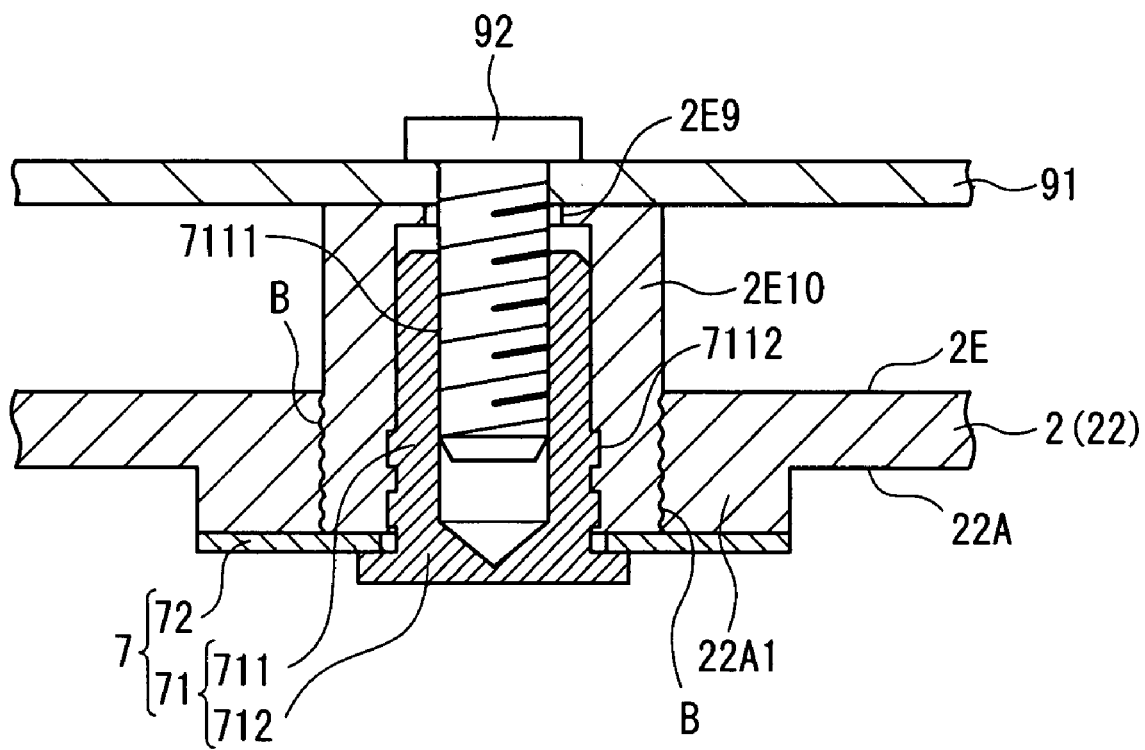
FIG. 5 is a cross section of the attaching structure according to the first exemplary embodiment.

FIG. 4 is an exploded perspective view of an attaching structure 7. FIG. 5 is a vertical cross section of the attaching structure 7. FIGS. 4 and 5 show the attaching structure 7 of the projector 1 in a suspended posture in which the upside of the projector 1 is set on the opposite side of a normal posture shown in FIGS. 1 and 2.

The lower case 22 of the exterior casing 2 is provided with the attaching structure 7 for attaching the projector 1 on a ceiling 91 and the like. The attaching structures 7 are provided on an inner surface 22A (a surface on the opposite side of the lower surface 2E of the lower case 22) of the lower case 22 at positions corresponding to the respective holes 2E9 (see FIG. 2).

As shown in FIGS. 4 and 5, the attaching structures 7 each include an insert nut 71 as an attaching member and a washer 72 as an interposed member.

The hole 2E9 is formed so as to vertically penetrate the lower case 22. The hole 2E9 is formed with a step such that an inner diameter of a portion that can be seen from the outside is small and an inner diameter of an inner portion is large (see FIG. 5).

The bosses 2E10 are formed so as to cover respective peripheries of the holes 2E9, the bosses 2E10 projecting from the lower surface 2E and the inner surface 22A of the lower case 22 (see FIGS. 4 and 5) in out-of-plane directions.

The insert nut 71 is made of metal and the like. The insert nut 71 includes a cylindrical portion 711 and a flange portion 712 formed on one end side of the cylindrical portion 711.

The cylindrical portion 711 corresponds to a cylindrical portion according to an exemplary aspect of the invention. An outer diameter of the cylindrical portion 711 is substantially the same as the inner diameter of the holes 2E9. The cylindrical portion 711 is heat-pressed into the hole 2E9 from the inner surface 22A side of the lower case 22, the cylindrical portion 711 being pressed from the opposite side of an end on which the flange portion 712 of the cylindrical portion 711 is formed.

A screw hole 7111 is formed inside the cylindrical portion 711, the screw hole 7111 being open on the end opposite to the end on which the flange portion 712 is formed. A bolt 92 provided on the ceiling 91 and inserted in the hole 2E9 is screwed in the screw hole 7111.

On an outer periphery of the cylindrical portion 711, a ring-shaped projection 7112 is formed. The ring-shaped projection 7112 is fitted to the inner surface of the hole 2E9 when the cylindrical portion 711 is press-inserted into the hole 2E9, the ring-shaped projection 7112 preventing the cylindrical portion 711 from falling off from the hole 2E9. Hence, the hole 2E9 constantly receives a stress that is in an outward direction given by the cylindrical portion 711.

The flange portion 712 is formed in a substantially circular shape in plan view so as to extend outward from the cylindrical portion 711 of which outer diameter is substantially the same as the inner diameter of the hole 2E9. The flange portion 712 has a larger outer diameter than the inner diameter of the hole 2E9. The flange portion 712 presses and holds the washer 72 against the boss 2E10, the washer 72 being interposed between the flange portion 712 and the boss 2E10, the boss 2E10 projecting from the inner surface 22A of the lower case 22. The flange portion 712 supports the exterior casing 2, when the projector 1 is in the suspended posture.

The washer 72 has a substantially circular shape in plan view, the washer 72 being provided with a hole 721 into which the cylindrical portion 711 of the insert nut 71 is inserted. The hole 721 has an inner diameter that is larger than the outer diameter of the cylindrical portion 711, the hole 721 being smaller than the outer diameter of the flange portion 712. Accordingly, the washer 72 abuts on the flange portion 712 of the insert nut 71, the washer 72 being pressed against the boss 2E10 by the flange portion 712.

Four ribs 22A1 are provided on the boss 2E10 that projects toward the inner surface 22A side and on which the washer 72 abuts. The ribs 22A1 are formed so as to radially extend from an outer periphery of the boss 2E1. The diameter of the ribs 22A1 from the center of the respective holes 2E9 is substantially the same as the diameter of the washers 72. The boss 2E10 and the rib 22A1 which rise from the inner surface 22A form a rising portion of the exemplary aspect of the invention.

To attach the projector 1 having the aforesaid attaching structure 7 on the ceiling 91, with the washer 72 interposed between the flange portion 712 of the insert nut 71 and the boss 2E10, the end of the boss 2E10 on the lower portion 2E side of the lower case 22 is brought into abutment on the ceiling 91 and the bolt 92 provided on the ceiling 91 is inserted into the hole 2E9 enclosed by the inner surface of the boss 2E10. Then, the bolt 92 inserted in the hole 2E9 is screwed into the screw hole 7111 of the insert nut 71 that is provided in the hole 2E9, so that the insert nut 71 and the bolt 92 are fixed to each other.

Herein, although the load of the projector 1 is transferred from the lower case 22 via the washer 72 to the flange portion 712 of the insert nut 71, since the ring-shape projection 7112 formed on the cylindrical portion 711 of the insert nut 71 fits to the inner surface of the hole 2E9, the insert nut 71 can be supported by the hole 2E9 and the projector 1 can be supported on the ceiling 91.

The above-described projector 1 can provide following exemplary effects.

As described above, the washer 72 is disposed between the flange portion 712 of the insert nut 71; and the boss 2E10 and rib 22A1 which are formed on the inner surface 22A of the lower case 22 of the exterior casing 2, the washer 72 having a larger diameter than the outer diameter of the flange portion 712.

Note that when the insert nut 71 is heat-pressed into the hole 2E9, the insert nut 71 is preheated. In inserting the insert nut 71, if no washer 72 is provided, the heat of the insert nut 71 may be transferred from the flange portion 712 to a surface of the boss 2E10, thereby causing a risk of deforming the boss 2E10 and displacing the fixing position of the insert nut 71. Hence, the insert nut 71 needs to be carefully press-inserted into the hole 2E9.

In contrast, if the washer 72 is interposed between the flange portion 712 of the insert nut 71 and the boss 2E10, the heat can be prevented from transferring from the flange portion 712 to the surface of the boss 2E10. Accordingly, workability in press-inserting the insert nut 71 into the hole 2E9 can be enhanced.

In addition, even if the hole 2E9 or the boss 2E10 is damaged when the projector 1 is set on the ceiling 91 and the like, the projector 1 can be prevented from falling off.

Further, when no washer 72 is provided and if a crack (such as the wavy lines B in FIG. 5) occurs in the hole 2E9 or the boss 2E10 due to a chemical stress crack and the like that is caused by oil and the like adhered on the insert nut 71, the lower case 22 may be split at the crack portion. In such a case, the insert nut 71 alone or the insert nut 71 with a portion of the lower case 22 in the vicinity of the hole 2E9 in which the crack occurs may fall off from the lower case 22 with the insert nut 71 and the bolt 92 engaged with each other, so that the projector 1 may fall off.

In contrast, since the washer 72 is interposed between the flange portion 712 of the insert nut 71 and the boss 2E10; and the washer 72 abuts on the boss 2E10 and the plurality of ribs 22A1, even if the hole 2E9 and the boss 2E10 are damaged, the washer 72 can support the load of the projector 1 at the abutting portion in which the washer 72 abuts on the plurality of ribs 22A1, thereby preventing the projector 1 from falling off.

Thus, by disposing the washer 72 between the lower case 22 and the insert nut 71 that is press-inserted in the hole 2E9 of the lower case 22, the projector 1 can be prevented from falling off in such a simple arrangement. Since the projector 1 employs the above-described attaching structure 7, the suspended posture of the projector 1 can be securely maintained.

Provided around each hole 2E9 in the inner surface 22A of the lower case 22 are the boss 2E10 and the plurality of ribs 22A1, the boss 2E10 rising from the inner surface 22A, the plurality of ribs 22A1 rising from the inner surface 22A and radially extending from the periphery of the boss 2E10. Accordingly, when the projector 1 is in the suspended posture, the washer 72 abuts thereon, so that a thickness of an area at which the lower case 22 is supported by the washer 72 can be large. Hence, since the load is applied on both the boss 2E10 and the plurality of ribs 22A1, strength of the lower case 22 can be enhanced and load per unit area can be reduced. Therefore, the projector 1 can be more reliably prevented from falling off.

Since the exterior casing 2 including the lower case 22 is made of synthetic resin, if the area having a larger thickness than the other areas becomes large, a sink mark may occur in molding the lower case 22, which may deform the exterior casing 2. In contrast, since the boss 2E10 and the rib 22A1 are formed in the area on which the washer 72 abuts, the area having a larger thickness of the lower case 22 can disperse, thereby reducing the area having a larger thickness than the other areas. Accordingly, a sink mark can be prevented or reduced in molding the lower case 22, preventing or reducing a deformation of the lower case 22 and thereby preventing or reducing a deformation of the exterior casing 2.

Second Exemplary Embodiment

A second exemplary embodiment of the invention will be described below with reference to the attached drawings.

The second exemplary embodiment is similar to the first exemplary embodiment in the outer appearance and inner structure of the projector 1 and the structure of the optical unit 4 (see FIGS. 1 to 3).

However, the second exemplary embodiment is partially different from the first exemplary embodiment in the structure of the boss 2E10 and the arrangement of the attaching structure 7. Accordingly, the structure of the boss 2E10 and the arrangement structure 7 of the second exemplary embodiment will be described below.

Structure of Boss 2E10

Figure 6:
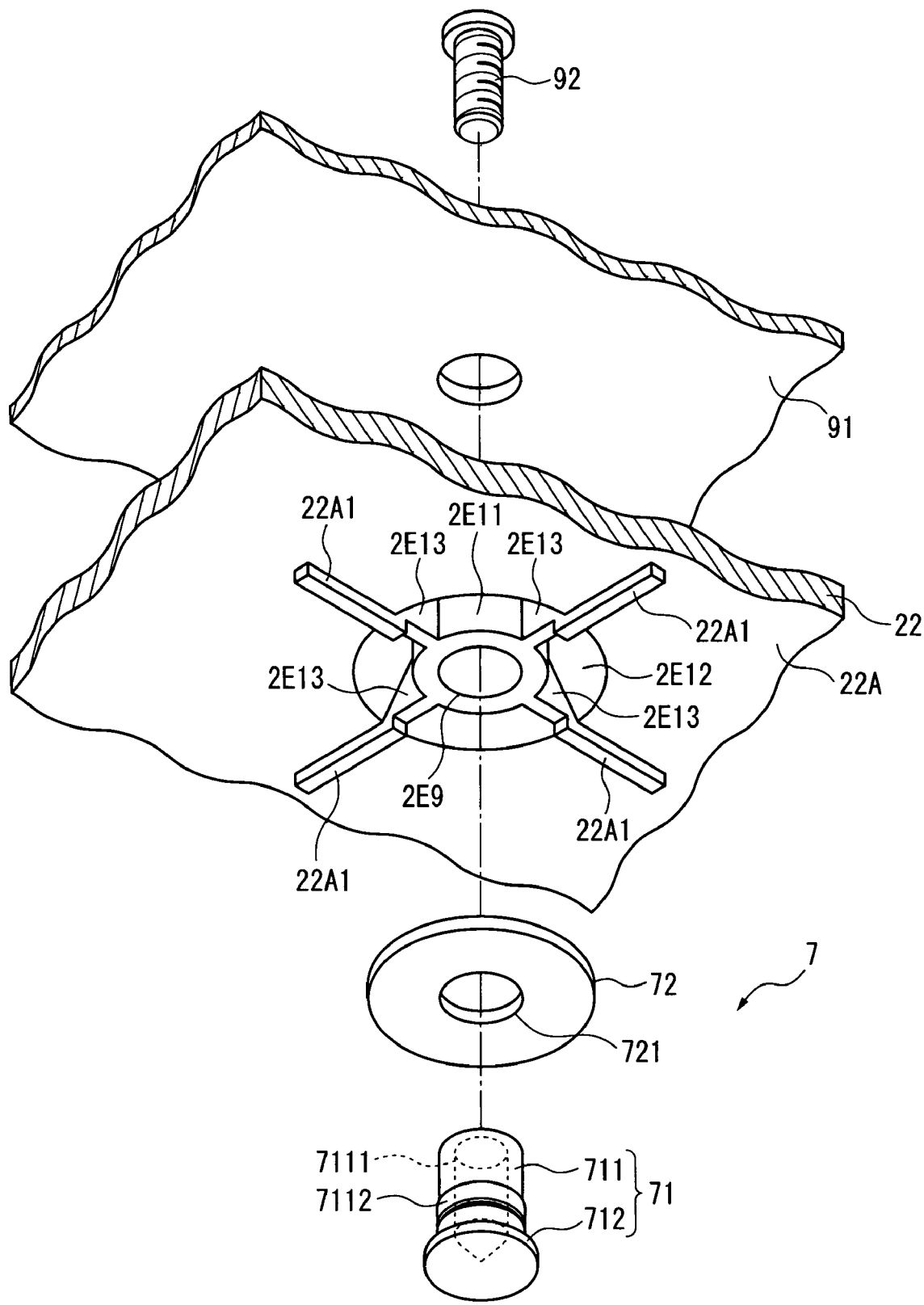
FIG. 6 is a perspective view showing a lower case and an attaching structure according to the second exemplary embodiment.
Figure 7:
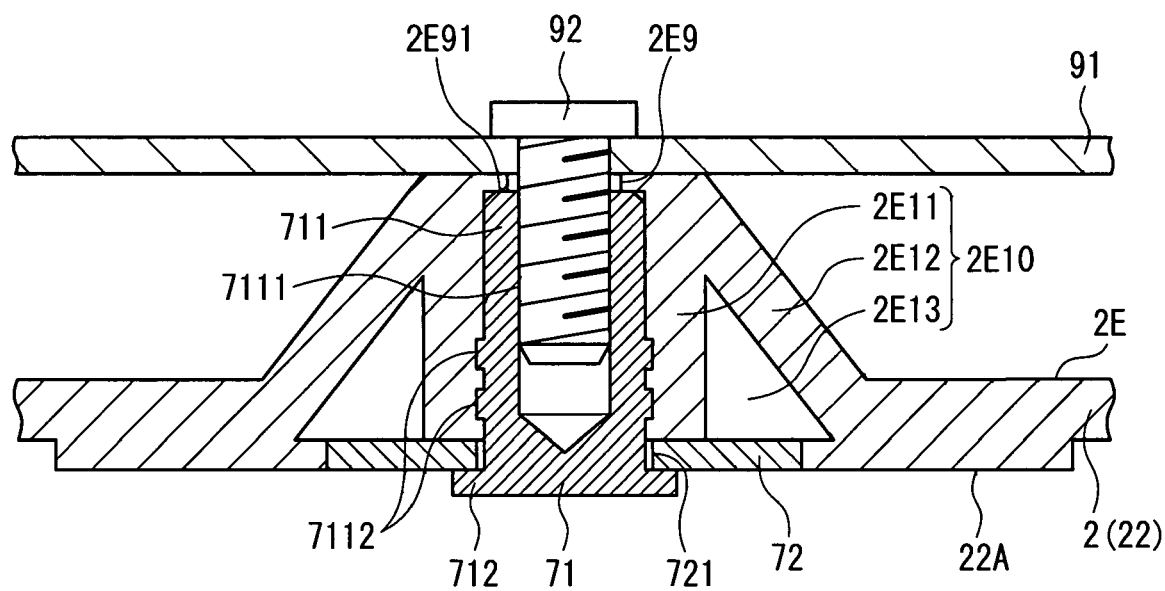
FIG. 7 is a cross section of the lower case and the attaching structure according to the second exemplary embodiment.

FIG. 6 is a perspective view showing the inner surface 22A of the lower case 22 and the attaching structure 7. FIG. 7 is a cross section showing the lower case 22 and the attaching structure 7. Note that the lower surface 2E of the lower case 22 is on the upper side in FIGS. 6 and 7.

The structure of the boss 2E10 formed on the lower case 22 will be described.

As stated above, the boss 2E10 forms the hole 2E9, the boss 2E10 being provided so as to project toward the lower side of the lower case 22 (the upper side in FIGS. 6 and 7). As shown in FIGS. 6 and 7, the boss 2E10 includes: a first lateral portion 2E11 forming the hole 2E9; a second lateral portion 2E12 formed around the periphery of the first lateral portion 2E11; and a rib 2E13 as a bridge portion which connects the first lateral portion 2E11 and the second lateral portion 2E12.

The first lateral portion 2E11 has a substantially cylindrical shape and projects so as to rise substantially vertically from the lower surface 2E of the lower case 22. Substantially in the middle of the first lateral portion 2E1, the hole 2E9 is formed so as to penetrate the lower case 22. When the projector 1 is fixed on the ceiling 91 of a building, the bolt 92 as the fixing member which is provided on the ceiling 91 is inserted in the hole 2E9.

In each of the holes 2E9, a step 2E91 is formed such that an inner diameter of a portion that can be seen from the lower surface 2E side is small and an inner diameter of an inner portion is large. In the hole 2E9, the later-described insert nut 71 is disposed from the inner side of the lower surface 2E. On the inner surface of the first lateral portion 2E11, the ring-shape projection 7112 of the insert nut 71 is fitted.

The second lateral portion 2E12 is formed on the outer side of the first lateral portion 2E11 with a predetermined distance from the first lateral portion 2E11. The second lateral portion 2E12 is formed so as to project from the lower surface 2E of the lower case 22 in the out-of-plane direction. Specifically, the second lateral portion 2E12 is inclined so as to be closer to the first lateral portion 2E11 as the second lateral portion 2E12 becomes further from the exterior casing 2. An end in the projecting direction of the second lateral portion 2E12 is connected with an end of the first lateral portion 2E1. The second lateral portion 2E12 has a substantially circular conic shape in plan view, so that the boss 2E10 has a substantially circular conical shape as a whole.

A plurality of the ribs 2E13 is provided to connect the first lateral portion 2E11 and the second lateral portion 2E12. In the second exemplary embodiment, four ribs 2E13 are radially provided around the first lateral portion 2E1. Specifically, the ribs 2E13 connect an outer peripheral surface of the first lateral portion 2E11 and an inner peripheral surface of the second lateral portion 2E12. When the first lateral portion 2E11 is under a force to deform the first lateral portion 2E11 so as to bulge outward, the ribs 2E13 prevents or reduces the deformation of the first lateral portion 2E11 in cooperation with the second lateral portion 2E12.

Around the boss 2E10, the plurality of ribs 22A1 is provided so as to rise in an out-of-plane direction from the inner surface (the surface on the opposite side of the lower surface 2E of the lower case 22) 22A of the lower case 22. The ribs 22A1 are formed on respective extended lines from the respective ribs 2E13 of the boss 2E10. Specifically, the four ribs 22A1 are formed so as to radially extend outward from positions slightly displaced to an inner side of the second lateral portion 2E12 of the boss 2E10. Ends of the ribs 2E13 on the hole 2E9 side position the washer 72 of the attaching structure 7.

Arrangement of Attaching Structure 7

The attaching structure 7 for attaching the projector 1 on the ceiling 91 of a building and the like is provided at a position on the inner surface 22A side of the lower case 22, the position corresponding to the above-described hole 2E9 and boss 2E10.

As shown in FIGS. 6 and 7, the attaching structure 7 includes the insert nut 71 as the attaching member and the washer 72.

The insert nut 71 is made of metal and the like. The insert nut 71 includes the cylindrical portion 711 and the flange portion 712 that is formed on the one end side of the cylindrical portion 711.

The cylindrical portion 711 corresponds to the cylindrical portion according to the exemplary aspect of the invention. An outer diameter of the cylindrical portion 711 is substantially the same as the inner diameter of the holes 2E9. The cylindrical portion 711 is heat-pressed into the hole 2E9 from the end on the inner surface 22A side of the lower case 22, the end being opposite to the end on which the flange portion 712 of the cylindrical portion 711. An end in the direction in which the cylindrical portion 711 is inserted into the hole 2E9 abuts on the step 2E91 formed in the hole 2E9, thereby preventing the insert nut 71 from falling off from the hole 2E9 when the projector 1 is in the suspended posture.

The screw hole 7111 is formed inside the cylindrical portion 711, the screw hole 7111 being open at the end of the cylindrical portion 711, the insert nut 71 being inserted into the hole 2E9 at the end. The bolt 92 that is provided on the ceiling 91 and inserted in the hole 2E9 is screwed in the screw hole 7111.

On the outer periphery of the cylindrical portion 711, two ring-shaped projections 7112 are formed so as to project in an out-of-plane direction. The ring-shaped projections 7112 are fitted to the inner surface of the hole 2E9 when the cylindrical portion 711 is press-inserted into the hole 2E9, the ring-shaped projections 7112 preventing the cylindrical portion 711 from falling off from the hole 2E9. Hence, the first lateral portion 2E11 of the boss 2E10 that forms the hole 2E9 constantly receives a stress in an outward direction which is given by the cylindrical portion 711.

The flange portion 712 is formed in a substantially circular shape so as to extend outward from the cylindrical portion 711 that has the substantially same outer diameter as the inner diameter of the hole 2E9. The flange portion 712 has a larger outer diameter than the inner diameter of the hole 2E9. The flange portion 712 presses and holds and the washer 72 against the boss 2E10, the washer 72 being interposed between the flange portion 712 and the boss 2E10 of the lower case 22, the flange portion 712 supporting the load of the projector 1 that is applied on the flange portion 712 via the washer 72 when the projector 1 is in the suspended posture.

The washer 72 has a substantially circular shape in plan view, the washer 72 being provided with the hole 721 in a substantially circular shape substantially at the center, into which the cylindrical portion 711 of the insert nut 71 is inserted. The hole 721 has an inner diameter that is larger than the outer diameter of the cylindrical portion 711 and is smaller than the outer diameter of the flange portion 712.

An outer diameter of the washer 72 has a diameter enough to cover substantially all of the ribs 2E13 of the bosses 2E10 when the washer 72 is disposed on the inner side of the ribs 22A1. Accordingly, the washer 72 abuts on the flange portion 712 of the insert nut 71, the washer 72 being pressed against the ribs 2E13 of the boss 2E10 by the flange portion 712.

To attach the projector 1 having the aforesaid attaching structure 7 on the ceiling 91, with the washer 72 interposed between the flange portion 712 of the insert nut 71 and the boss 2E10 of the lower case 22, the end of the boss 2E10 on the lower surface 2E side of the lower case 22 is brought into abutment on the ceiling 91 and the bolt 92 provided on the ceiling 91 is inserted into the hole 2E9 that is formed in the first lateral portion 2E11 of the boss 2E10. Then, the bolt 92 inserted in the hole 2E9 is screwed into the screw hole 7111 of the insert nut 71 that is provided in the hole 2E9, so that the insert nut 71 and the bolt 92 are fixed to each other.

Herein, although the load of the projector 1 is transferred from the lower case 22 via the washer 72 to the flange portion 712 of the insert nut 71, since the ring-shape projection 7112 formed on the cylindrical portion 711 of the insert nut 71 fits to the inner surface of the hole 2E9 and the end of the cylindrical portion 711 abuts on the step 2E91 in the hole 2E9, the insert nut 71 can be prevented from falling off from the hole 2E9. In addition, since the flange portion 712 supports the load of the projector 1 which is applied on the flange portion 712 via the washer 72, so that the projector 1 can be supported and fixed on the ceiling 91.

The above-described projector 1 can provide following exemplary effects.

As described above, the plurality of ribs 2E13 connect the first lateral portion 2E11 of the boss 2E10 and the second lateral portion 2E12 formed around the first lateral portion 2E11, the boss 2E10 forming the hole 2E9 in which the insert nut 71 is disposed. Accordingly, even when a crack occurs in the first lateral portion 2E11 and the crack may cause the first lateral portion 2E11 to bulge outward, the second lateral portion 2E12 and the ribs 2E13 can prevent or reduce the deformation of the first lateral portion 2E11. Hence, even when the first lateral portion 2E11 is damaged, the insert nut 71 can be confined on the inner side of the first lateral portion 2E11 (in the hole 2E9), so that the insert nut 71 can support the load of the projector 1.

When the insert nut 71 on which oil and the like are adhered is press-inserted into the hole 2E9, the oil and the like may permeate into the first lateral portion 2E11, which may cause a chemical stress crack. In such an arrangement, a crack may occur in the first lateral portion 2E11 at a position near the insert nut 71. When the crack becomes large, the first lateral portion 2E11 may split, which may cause the insert nut 71 to fall off from the hole 2E9. Although such a risk exists, even when the crack occurs in the first lateral portion 2E1, a deformation of the first lateral portion 2E11 can be prevented or reduced by the second lateral portion 2E12 and the ribs 2E13, so that the insert nut 71 can be prevented from falling off from the hole 2E9. Hence, the insert nut 71 can securely support the exterior casing 2, the projector 1 can be prevented from falling off from the ceiling 91 with a simple arrangement.

The first lateral portion 2E11 and the second lateral portion 2E12 of the boss 2E10 are connected with each other via the ribs 2E13. In other words, a space is formed between the first lateral portion 2E11 and the second lateral portion 2E12. Hence, even when the crack occurs in the first lateral portion 2E11 as stated above, the crack can be prevented or suppressed from developing into the second lateral portion 2E12, a deformation of the first lateral portion 2E11 can be constantly prevented or reduced by the second lateral portion 2E12 and the ribs 2E13. Accordingly, even when the crack occurs in the first lateral portion 2E11, a deformation of the first lateral portion 2E11 can be reliably prevented or suppressed, so that the projector 1 can be prevented from falling off even when the projector 1 is in the suspended posture in a long time.

The second lateral portion 2E12 is provided so as to be inclined such that the end of the second lateral portion 2E12 in the projecting direction from the lower surface 2E of the second lateral portion 2E12 becomes close to the first lateral portion 2E11, so that the boss 2E10 is formed in a substantially circular conical shape as a whole. Compared with an arrangement in which the boss 2E10 is formed in a substantially cylindrical shape, the ribs 2E13 can have a portion of a small diameter. Hence, the distance between the first lateral portion 2E11 and the second lateral portion 2E12 can be small. Accordingly, even when the first lateral portion 2E11 is damaged, resistance against the bulging force toward the outside of the first lateral portion 2E11 can be large, so that a deformation of the first lateral portion 2E11 can be more reliably prevented or suppressed.

In addition, since the boss 2E10 is formed in the substantially circular conical shape, the boss 2E10 can be formed more easily compared with an arrangement in which the boss 2E10 is formed in a polyhedral pyramid shape such as a triangle pyramid shape and a rectangular pyramid shape, so that the lower case 22 can be easily released from a die in molding. Thus, the lower case 22 can be formed more simply.

Further, the boss 2E10 is formed so as to project from the lower surface 2E that is on the outer side of the exterior casing 2. Accordingly, the ribs 2E13 that connect the first lateral portion 2E11 and the second lateral portion 2E12 forming the boss 2E10 are exposed on the inner surface 22A side of the lower case 22. Hence, projections on the lower surface 2E of the lower case 22 can be reduced and the ribs 2E13 are formed on the inner surface 22A side on which the positioning projections and the like are formed, so that the lower case 22 can be more easily released from the die in molding. Thus, the lower case 22 can be formed more simply.

Since the insert nut 71 is provided with the flange portion 712 facing the inner surface 22A of the lower case 22, even when the projector 1 is in the suspended posture, the flange portion 712 supports the load of the projector 1, thereby reliably preventing the projector 1 from falling off.

The washer 72 is interposed between the flange portion 712 of the insert nut 71 and the boss 2E10 of the lower case 22. The outer diameter of the washer 72 is formed to be larger than the outer diameter of the flange portion 712. Accordingly, an area in which the flange portion 712 of the insert nut 71 is engaged via the washer 72 can be large. Hence, the insert nut 71 can be more reliably prevented from falling off from the hole 2E9 of the lower case 22, thereby preventing the projector 1 from falling off more reliably.

Since the washer 72 is interposed between the flange portion 712 and the boss 2E10, workability in press-inserting the insert nut 71 can be enhanced.

Specifically, when the insert nut 71 is heat-pressed into the hole 2E9, the insert nut 71 is preheated. In inserting the insert nut 71, if no washer 72 is provided, the heat of the insert nut 71 may be transferred from the flange portion 712 to a surface of the boss 2E10, thereby deforming the boss 2E10 and displacing the fixing position of the insert nut 71. Hence, the insert nut 71 needs to be carefully press-inserted into the hole 2E9.

In contrast, when the washer 72 is interposed between the flange portion 712 of the insert nut 71 and the boss 2E10, the heat can be prevented from transferring from the flange portion 712 to the surface of the boss 2E10. Accordingly, workability in press-inserting the insert nut 71 into the hole 2E9 can be enhanced.

In addition, since the outer diameter of the washer 72 has the diameter enough to reach the ribs 2E13 forming the boss 2E10, the load of the projector 1 which is applied on the flange portion 712 of the insert nut 71 can be dispersed on the ribs 2E13 by the washer 72, thereby reducing the load per unit area. Thus, the projector 1 can be stably supported.

Further, even when the connecting portion between the first lateral portion 2E11 and the ribs 2E13 is damaged, the washer 72 contacting on the ribs 2E13 can more reliably prevent the first lateral portion 2E11 and the insert nut 71 from falling off. Therefore, the projector 1 can be more reliably prevented from falling off.

Modifications of Exemplary Embodiments

Although a best mode and the like for implementing an exemplary aspect of the invention have been disclosed above, the invention is not limited thereto. The above-disclosed description limiting shapes, materials and the like is intended only to be illustrative for easier understanding but not to limit the scope of the invention, hence the scope of the invention includes description using a name of the components without a part of or all of the limitation on the shapes, materials and the like.

In the exemplary embodiments, the bolt 92 provided on the ceiling 91 is employed as the fixing member, while the insert nut 71 to be engaged with the bolt 92 is employed as the attaching member. However, the arrangement is not limited thereto. For example, the fixing member and the attaching member may be a couple of components like a plug in which one member is fitted into the other member. Although the insert nut 71 is provided with the cylindrical portion 711, this portion may be any shape as long as the shape is tubular.

In the exemplary embodiments, the washer 72 is employed as the interposed member, but the arrangement is not limited thereto. For example, the interposed member may be a plate body of a substantially rectangular shape as long as the interposed member has strength enough to support the load of the projector 1. In addition, the washer 72 as the interposed member is formed with the hole 721 through which the cylindrical portion 711 of the insert nut 71 is inserted, but the arrangement is not limited thereto. For example, it is only necessary that the interposed member be provided between the flange portion 712 of the insert nut 71 and the inner surface 22A of the lower case 22, so that the interposed member formed by a plurality of components may be provided so as to cover the periphery of the hole 2E9 in which the insert nut 71 is fitted.

In the exemplary embodiments, the ribs 22A1 forming the rising portion is adapted to radially extend from the outer periphery of the boss 2E10 forming the rising portion. For example, the rib may be provided to cover the periphery of the boss 2E10 in a concentric manner relative to the hole 2E9. The rising portion may have another shape other than the hereexemplified concentric shape.

In the exemplary embodiments, the boss 2E10 is formed in a substantially circular conical shape. However, the boss 2E10 may have a tubular shape like a cylindrical shape or a polyhedral pyramid shape like a triangular polyhedral shape. The boss 2E10 projects in an out-of-plane direction from the lower surface 2E of the lower case 22 that is the outer surface of the exterior casing 2. However, the boss 2E10 may be formed to project in an out-of-plane direction from the inner surface 22A.

In the exemplary embodiments, the four ribs 2E13 connecting the first lateral portion 2E11 and the second lateral portion 2E12 of the boss 2E10. However, the arrangement is not limited thereto, but the number of the ribs 2E13 may be appropriately set.

In the exemplary embodiments, the outer diameter of the washer 72 is formed so as generally to cover the ribs 2E13. However, the arrangement is not limited thereto. It is only necessary that the washer 72 have an outer diameter larger than the outer diameter of the flange portion 712 of the insert nut 71.

In the exemplary embodiments, the projector 1 has the three liquid crystal panels 441R, 441G, 441B, but the arrangement is not limited thereto. Specifically, an exemplary aspect of the invention can be applied to a projector having two or four or more of liquid crystal panels.

In the exemplary embodiments, the optical unit 4 has a substantially L-shape in plan view, but the arrangement is not limited thereto. For example, the optical unit 4 may have a substantially U-shape in plan view.

In the exemplary embodiments, the liquid crystal panels 441 are a transmissive type that have a light incident surface and a light emitting surface individually, but may be a reflective type in which a light incident surface and a light emitting surface are in one plane.

In the exemplary embodiments, the projector 1 provided with the liquid crystal panels 441 as the optical modulator is exemplified. However, the optical modulator may be another type as long as the optical modulator can form an optical image by modulating incident light in accordance with image information. For example, an exemplary aspect of the invention can be applied to a projector using an optical modulator other than the liquid crystal panel such as a device using a micromirror. When such an optical modulator is used, the polarization plates 442, 443 on the light beam incident side and the light beam emitting side may be omitted.

In the exemplary embodiments, the projector 1 is attached on the ceiling 91. However, the arrangement is not limited to the ceiling, but the projector 1 may be attached on a lateral wall of a building or on a wall surface of a wall and the like.

In the exemplary embodiments, the projector 1 is directly attached on the ceiling 91. However, the arrangement may be any as long as the projector 1 is fixed with a bolt. For example, the projector may be fixed on the ceiling with an attaching jig interposed.

An exemplary aspect of the invention may be utilized for a projector attachable on a ceiling or a surface of a lateral wall and the like.

What is claimed is:

1. A projector, comprising:
   a light source;
   an optical modulator that modulates a light beam emitted from the light source to form an optical image;

a projection optical device that projects the formed optical image;

an exterior casing that accommodates the light source, the optical modulator and the projection optical device, the exterior casing being made of a synthetic resin and provided with a hole in which a fixing member fixing the projector at a predetermined position is inserted, the hole penetrating the exterior casing;

an attaching member engaged with the fixing member that is inserted through the hole at a position corresponding to the hole in the exterior casing, the attaching member having a flange portion facing an inner surface of the exterior casing, the flange portion having an outer diameter larger than an inner diameter of the hole;

an interposed member disposed between the inner surface of the exterior casing and the flange portion, the interposed member having an outer diameter larger than an outer diameter of the flange portion; and a plurality of ribs rising from the inner surface of the exterior casing, dimensions of the ribs corresponding to the outer diameter of the interposed member, the ribs radially extending from a center of the hole.

2. The projector according to claim 1, wherein:

the attaching member is an insert nut that is inserted in the hole, the insert nut having a cylindrical portion in which a screw hole is formed;

the interposed member is a washer that has a hole in which the cylindrical portion is inserted; and the fixing member is a bolt screwed into the screw hole.

3. A projector, comprising:

a light source;

an optical modulator that modulates a light beam emitted from the light source to form an optical image;

a projection optical device that projects the formed optical image;

an exterior casing that accommodates the light source, the optical modulator and the projection optical device, the exterior casing provided with a boss having a hole in which a fixing member that fixes the projector at a predetermined position is inserted and a plurality of ribs that are formed on an inner surface of the exterior casing and radially extend from an outer periphery of the boss; and an attaching member disposed inside the hole, the attaching member engaging with the exterior casing and the fixing member inserted in the hole;

the boss having:

a first lateral portion forming the hole, a second lateral portion formed apart from the first lateral portion by a predetermined distance, the second lateral portion enclosing a periphery of the first lateral portion, and a bridge portion connecting the first lateral portion and the second lateral portion; wherein:

the attaching member is provided with a flange portion facing the inner surface of the exterior casing, the flange portion having an outer diameter larger than an inner diameter of the hole;

an interposed member is disposed between the inner surface of the exterior casing and the flange portion, the interposed member having an outer diameter larger than the outer diameter of the flange portion; and the interposed member is disposed in an area enclosed by the plurality of ribs.

4. The projector according to claim 3, wherein:

the boss is formed in a substantially circular conical shape or a polyhedral pyramid shape; and the second lateral portion is formed so as to be closer to the first lateral portion as the second lateral portion projects in an out-of-plane direction of the exterior casing.

5. The projector according to claim 3, wherein:

the boss is formed so as to project in an out-of-plane direction from an outer surface of the exterior casing.

6. The projector according to claim 3, the attaching portion further including:

a cylindrical portion that is inserted in the hole, wherein the flange portion is provided on an end of the cylindrical portion so as to project in a direction substantially orthogonal to an axial direction of the cylindrical portion; and the interposed member has an opening in which the cylindrical portion is inserted.

7. The projector according to claim 6, wherein:

the interposed member is a washer; and the outer diameter of the washer is at least enough to reach the bridge portion.

8. The projector according to claim 1, wherein the exterior casing has a boss that encloses the hole and protrudes toward an outside of the exterior casing, and an outer diameter of the interposed member is larger than an outer diameter of the boss.

* * * * *